United States Patent [19]
Chou et al.

[11] Patent Number: 5,892,906
[45] Date of Patent: Apr. 6, 1999

[54] APPARATUS AND METHOD FOR PREVENTING THEFT OF COMPUTER DEVICES

[76] Inventors: Wayne W. Chou, 25 Hauley Pl., Ridgefield, Conn. 06877; Laszlo Elteto, 86 Snow Crystal La., Stamford, Conn. 06905; Joseph M. Kulinets, 40 Meredith La., Stamford, Conn. 06903; Joseph LaRussa, 43 Lowell St., Hicksville, N.Y. 11801

[21] Appl. No.: 684,659

[22] Filed: Jul. 19, 1996

[51] Int. Cl.$^6$ ....................................................... G06F 7/00
[52] U.S. Cl. ........................................ 395/188.01; 395/652
[58] Field of Search ........................... 395/186, 188.01, 395/187.01, 183.12, 652; 380/3, 4, 23, 25

[56] References Cited

U.S. PATENT DOCUMENTS

| | | | |
|---|---|---|---|
| 4,634,807 | 1/1987 | Chorley et al. | 178/22.08 |
| 4,757,533 | 7/1988 | Allen et al. | 380/25 |
| 4,864,494 | 9/1989 | Kobus, Jr. | 395/186 |
| 4,866,769 | 9/1989 | Karp | 380/4 |
| 4,937,861 | 6/1990 | Cummins | 380/2 |
| 5,007,082 | 4/1991 | Cummins | 380/4 |
| 5,097,504 | 3/1992 | Camion et al. | 380/23 |
| 5,146,499 | 9/1992 | Geffrotin | 380/23 |
| 5,214,695 | 5/1993 | Arnold et al. | 380/4 |
| 5,222,135 | 6/1993 | Hardy et al. | 380/4 |
| 5,325,430 | 6/1994 | Smyth et al. | 380/4 |
| 5,363,446 | 11/1994 | Ruppertuz et al. | 380/4 |
| 5,369,707 | 11/1994 | Follendore, III | 380/25 |
| 5,377,269 | 12/1994 | Heptig et al. | 380/25 |
| 5,402,492 | 3/1995 | Goodman et al. | 380/25 |
| 5,410,699 | 4/1995 | Bealkowski et al. | 395/700 |
| 5,421,006 | 5/1995 | Jablon et al. | 395/183.14 |
| 5,432,939 | 7/1995 | Blackledge, Jr. et al. | 395/700 |
| 5,448,045 | 9/1995 | Clark | 380/4 |
| 5,483,596 | 1/1996 | Rosenow et al. | 380/25 |
| 5,483,649 | 1/1996 | Kuznetsov et al. | 395/186 |
| 5,497,421 | 3/1996 | Kaufman et al. | 380/23 |
| 5,535,409 | 7/1996 | Larvoire et al. | 395/188.01 |
| 5,586,301 | 12/1996 | Fisherman et al. | 395/186 |
| 5,615,263 | 3/1997 | Takahashi | 380/4 |
| 5,707,777 | 1/1998 | Sloan et al. | 395/188.01 |

*Primary Examiner*—Joseph E. Palys
*Attorney, Agent, or Firm*—Pollock, Vande Sande & Amernick

[57] ABSTRACT

Apparatus and method for discouraging computer theft. The apparatus and method requires that a password or other unique information be supplied to the computer before the computer BIOS routines can be completely executed. A BIOS memory storing the BIOS routines includes a security routine which will determine whether or not the required password entered by the user, or a known quantity read from an externally connected memory device is present. The security function stored within the BIOS memory also includes an administration function which permits the computer to be either placed in a locked state, thereby requiring password or the known quantity read from an externally connected memory device to be present each time the computer is booted up. The administration function also permits an unlock state which permits the computer boot up process to complete without entering any password or externally supplied quantity. The external memory location is consulted during each boot up sequence, to determine whether the computer has been placed in the locked or in the unlocked state. If the security depends upon the supply of the known quantity from an externally connected memory device, the computer will be inoperable to anyone not in possession of the external memory device. In the event that the external memory location bearing the locked or unlocked code is removed, the security function assumes the computer to be in the locked state, thus frustrating avoidance of the locked state by tampering with the external memory.

16 Claims, 5 Drawing Sheets

APPARATUS AND METHOD FOR PREVENTING THEFT OF COMPUTER DEVICES

The present invention relates to the personal computer art. Specifically, an apparatus and method are provided which discourages the theft of personal computer systems by rendering them inoperable to an unauthorized user.

The popularity of personal computing devices such as notebook computers has resulted in an alarming increase in theft of these devices. Although it is common to provide password protection for computers, it is possible to avoid the password protection by making some modified hardware changes to the stolen computer. In prior art password protection schemes, a password is stored in a CMOS RAM on the mother board of the personal computer. If power is removed from the computer including any backup battery power supply, the CMOS RAM will eventually be reset, and the protection of a stored password in the CMOS RAM is lost.

Password protection may also be provided by a system which stores the required password on the computer hard disk. At boot up time, the password is retrieved from the hard disk and compared with a manually entered password. Password protection passwords stored on the computer hard disk may be defeated however, if the disk is completely reformatted by a thief or his customer.

The automobile industry has had to confront the theft of automobile radios with specific anti-theft circuits built into the automobile radio. Theft protection circuitry incorporated in the automobile radio renders the automobile radio useless when it is removed from the vehicle. These measures have discouraged the traffic in stolen car radios, as the units are inoperable after the theft, and any attempts to have them repaired would likely reveal the theft.

The implementation of anti-theft measures in a personal computer such as a notebook computer must be effective against the most technically sophisticated of thieves, but not be so elaborate as to interfere with its normal use. The need for theft security measures must be measured against the inconvenience to the authorized user who may need to power up the computer device on a frequent basis at times when protection against theft is not needed. In these circumstances, it is useful to have an anti-theft measure which may be deactivated at the option of the user once the user clearly establishes himself as authorized to deactivate the anti-theft circuitry. Other problems which may result in the use of these protection schemes include the inconvenience which results from the loss of a password by a user. In these instances it may be necessary to resort to the manufacture of the device to determine what password should be used or to install a new password, representing an obvious drawback for owners of these systems.

Many computer manufacturers have implemented password protection in the computer BIOS (Basic Input/Output System) which is integral to the operation of a personal computer. The password protection in the BIOS halts the system boot up unless the user enters a password which is also stored in the foregoing CMOS RAM. As noted, if the power is removed from the CMOS RAM, the password is cleared and the system will boot up without requiring the user to enter the required password.

Recent changes in the computer BIOS memory storage devices permit writing data to the BIOS memory, offering the opportunity to provide password protection within the same memory which stores the BIOS routines. Thus, any attempt to delete the protection will result in the BIOS routine being disabled, disabling the boot up process. EEPROM flash devices may be programmed with BIOS routines which permit the user to enter data without requiring the computer to be returned to the manufacture. The present invention makes use of these new BIOS memory devices for effecting security measures which discourage theft.

SUMMARY OF THE INVENTION

The present invention provides for an apparatus and method for discouraging theft. The invention requires that a user enter a unique word or number related to the particular computer each time the computer is powered up. The computer BIOS memory for storing the BIOS routines also stores a security routine. As a minimum, the security routine requires verification of a password entered by the user, or a verification of a quantity read from an externally connected memory device. The security function stored in the BIOS memory also includes an administration function which may be invoked by the user following the normal boot up sequence initiated by the BIOS once the password or validation quantity is verified. The administration function may be invoked by the user to place the computer in the locked state which requires verification each time the computer executes the BIOS routines, or in the unlocked state in which the protection is bypassed each time the BIOS routines are executed. The locked or unlocked state is programmed by writing a code representing each state to an internal memory. During execution of the BIOS routines, the internal memory location containing the code is read, and the security function is invoked, or not, depending on the value of the read code.

In accordance with one embodiment of the invention, when the computer is in the locked state, the external memory must be operatively connected to the computer each time the computer is booted up. If the user removes the external memory, or inadvertently forgets to attach it to the computer, the security function will halt complete execution of the BIOS routines.

In another embodiment of the invention, the locked state requires the user to manually enter the password through the keyboard in response to a prompt during execution of the BIOS routine. The security function compares a unique, user defined password stored in the BIOS memory to the user supplied password. If the two passwords agree, the computer completes execution of the BIOS routine.

In either embodiment, the computer may be unlocked by accessing the administrative function once the computer has completed execution of the BIOS routines. In the unlocked state neither the external memory is necessary nor is the user required to enter a password each time the system is booted up.

DESCRIPTION OF THE PREFERRED EMBODIMENT

Figure 1:
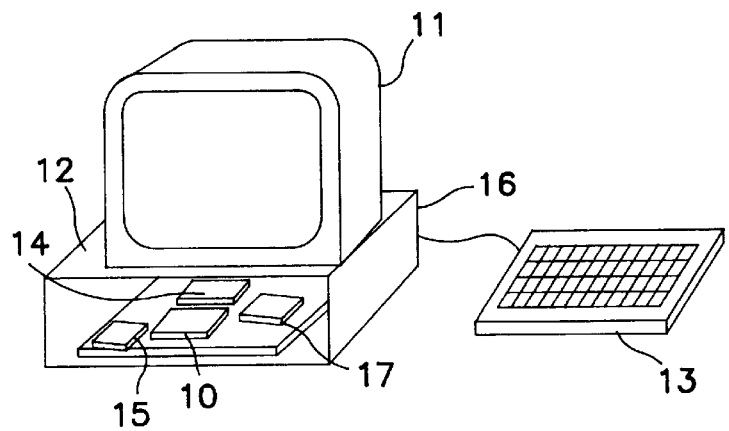
FIG. 1 illustrates the basic components of a personal computing system.

Referring now to FIG. 1, a general organization of a personal computer 10 is shown which includes a security function stored as a programming routine within the BIOS EEPROM 15. As will be evident with respect to the description of this embodiment, the BIOS routines which provide for the basic input/output system cannot be completely executed unless the security function is successfully executed.

As will be understood by those familiar with the architecture of a personal computer, a CPU 14, a CMOS RAM 17, and the BIOS memory is supported on a mother board which permits upgrades to be made to the system. A serial port 16 permits the computer 10 to communicate with externally connected devices. A monitor 11 and keyboard 13 provide a user interface with the personal computer 10.

Figure 2:
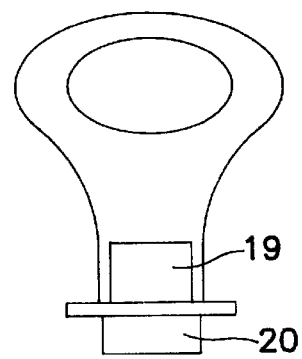
FIG. 2 illustrates in accordance with a preferred embodiment of the invention a security key for preventing operation of the personal computer when it is disconnected from the computer.

In accordance with the preferred embodiment of the present invention, a memory device such as a detachable read only memory (ROM), 19 shown in FIG. 2 having nine pin connector 20 may be detachably connected to the serial port 16. The detachable ROM 19 of FIG. 2 serves as a key which contains information necessary to permit the BIOS routine stored within BIOS memory 15 to complete execution. The BIOS routines perform various functions, such as power-on self tests (POST), peripheral routines, boot codes, etc., for initially loading the computer operating system software from a hard disk memory, or from floppy disk associated with the computer 10. The key has a small form factor permitting it to be carried separately by the user on a key chain. Thus, if the computer 10 is stolen, the key is not stolen with it.

Figure 3:
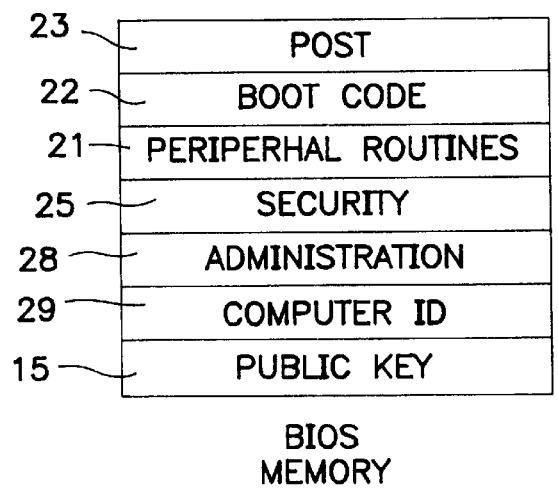
FIG. 3 illustrates the organization of a memory 15 holding the BIOS routines as well as a security function for the computer.

FIG. 3 illustrates the organization of the BIOS memory 15 which may be a flash EEPROM containing the various executable BIOS routines as well as routines for implementing a security function. Inclusion of routines for executing a security function 25 with the BIOS routines is particularly useful in preventing a thief from bypassing security measures which might have been implemented on the hard drive, or in an application program, or which previously made use of the CMOS RAM 17. Unless the BIOS routine has completely executed, the computer operating system can never be accessed rendering the computer inoperative.

The contents of the BIOS memory 15 are illustrated in FIG. 3, including the POST (power-on self test) routine 23, the boot code 22 for loading the computer operating system in RAM, and routine 21 for configuring peripheral devices connected to computer 10.

The security routines 25 within the BIOS memory require a user to follow a specific procedure which identify the user as an authorized user. If the user is not verified as authorized, the BIOS routines will not be completely executed, rendering the computer inoperative.

The EEPROM of FIG. 3 which serves as the BIOS memory 15 includes a first unique, one of a kind, computer ID 28 established by the computer manufacturers, and a public decryption key 29. As will be evident during the description of the installation stage, the security key of FIG. 2 stores a unique serial number in ROM 19 as well as an encrypted value of the product of the key serial number and the computer's I.D. During execution of the security function, the contents of key ROM 19 are read. The encrypted quantity is decrypted, and compared with a product formed from the serial number read from ROM 19 and the stored computer I.D. 28 stored in the BIOS memory 15. If these quantities match, the BIOS routine continues execution.

Two keys may be provided, and in the event one key is mislaid, the other key permits access to the administrative function which can unlock the computer permitting operation of the computer. The stored public key 29 is provided at the time the BIOS EEPROM is configured, which permit decoding of encrypted values stored within the keys. Either of these keys may be used to gain access to the administration function should one key be lost or unavailable.

Figure 4:
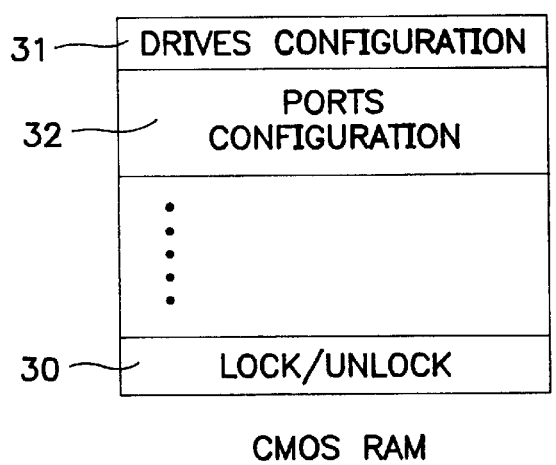
FIG. 4 illustrates the organization of a CMOS RAM 17 which participates in the security function.

FIG. 4 illustrates the CMOS RAM 17 which is common to the personal computer architecture. The CMOS RAM 17 includes Drive Configuration Routines 31 and POST Configuration Routines 32. CMOS RAM 17 has a memory location 30 which when empty, represents a locked state for the computer. If the computer is in the unlocked mode, the memory location 30 is written with a non zero unlocking code. Once the computer has been set via the administration mode of the security function 25, to be in the locked state, the contents of memory location 30 will be set to 00. Consequently, if the CMOS RAM 17 is removed by a thief, or otherwise erased, the computer remains in the locked state, inhibiting completion of the BIOS routine execution.

During the execution of the normal BIOS routines within the BIOS memory 15 of FIG. 3, the contents of memory location 30 are checked and if the contents of memory location 30 of the CMOS RAM 17 indicate a locked condition, the POST routine 23 will stop execution before the BOOT routine 22 can be executed, and enter the security routine 25. Once in the security 25 routine, the security routine attempts to read the contents of the security key ROM 19 connected to the serial port 16. If security key 19 is connected to serial port 16, the unique key serial number and encrypted product M are read. The security function forms a product of the read serial number and the computer I.D. 28 stored in BIOS EEPROM 15. The security function 25 decrypts the second encrypted value M read from security key 19, and compares it with the computed product. If a match is produced by the comparison, the computer goes on to execute the BOOT codes 22 and peripheral routines 21.

The administration function of the security routine 25 permits the user to place the machine either in an unlocked state or a locked state. In the unlocked state, the BIOS POST routine 23 skips the security function and executes the BOOT code 22 and peripheral routines 21. If the computer is in the locked mode as previously described, the BIOS routine execution is halted during execution unless the appropriate security key ROM 19 is connected to the serial port 16.

The advantage of the foregoing system is readily apparent. If the user is concerned about theft, he configures the machined to be in the locked mode, thereby inhibiting operation unless his personal security key including ROM 19 is connected to the serial port 16. While the computer 10 is unattended, the user may remove the security key. If the device of computer 10 is stolen while in the locked mode, a subsequent user will not be able to activate the computer 10 of FIG. 1 without the unique security key. A security key is only useful for accessing one computer 10, and the acquisition of another security key with another serial number or encrypted value will not enable the thief to operate the computer 10.

Since the CMOS RAM memory location 30 was configured so that a zero entry within the CMOS RAM location 30 constitutes the locked mode, replacing the CMOS RAM or disabling power to it will only place it in the locked mode, and execution of the BIOS routine is therefore effectively inhibited rendering computer 10 of nearly worthless value to a thief, discouraging future thefts.

Figure 5:
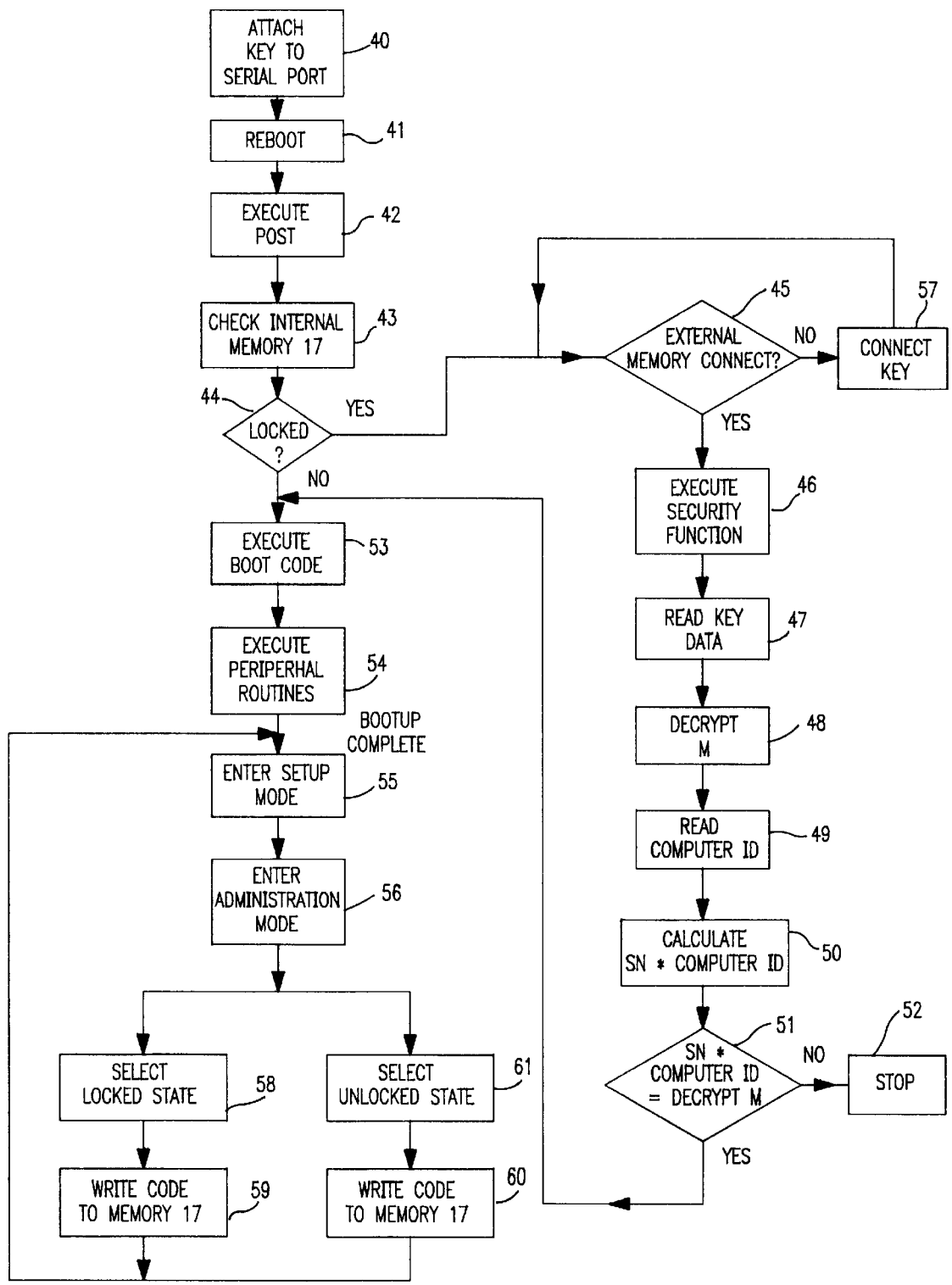
FIG. 5 illustrates the execution of the security routines by the preferred embodiment requiring the physical key to be connected to the computer.

FIG. 5 illustrates the step-by-step process for executing the security function 25 as well as locking and unlocking the computer in accordance with the preferred embodiment. In step 40 the user attaches the key containing the ROM 19 to the serial port 16 of the computer. The computer is rebooted in step 41 through a software reboot command.

Any subsequent operation of the computer requiring the computer to be rebooted can only occur after the user attaches the key having ROM 19 to serial port 16 as shown in step 40 unless the user enters the unlocked state. After completing the POST routine 42, the BIOS routine examines the contents of CMOS RAM 17 in step 43, and enters the security routine 25 if the computer 10 was not previously set in the unlocked state as is determined in decision block 44.

The computer will be in the lock state if it has not previously been specifically set in the unlocked state. If the external ROM 19 is not connected as determined in decision 45, a message is posted to the user "CONNECT KEY". The security routines are executed in step 46, by first reading the contents of the ROM of the key 19 attached to serial port 16. The ROM contains two values, an unencrypted serial number unique to the key, and an encrypted value M which represents the product of the serial number of the key and the computer I.D. number. A decryption subroutine is entered in step 48, which using the public key 29 stored within the BIOS memory 15, decrypts the value of the product M. The security routines then reads, in step 49, the computer I.D. from location 28 of the BIOS memory 15. A product is calculated in step 50, between the read serial number from the attached key 19, and the computer I.D. 28 obtained from the BIOS memory 15.

The two products are compared in decision block 51 and if a match occurs, then the user has been verified as possessing the connect key and is authorized to use the computer. The remaining boot code is executed in steps 53 and the peripheral routines are executed in step 54. This represents the completion of the BIOS routine execution, permitting the user to operate the computer in the normal way. In the event the comparison is not obtained in decision block 51, the boot up process is stopped in step 52 inhibiting any further use of the computer.

In those circumstances where the user believes theft to be of minimal risk, and wishes to unlock the computer so that the security key is unnecessary, the user may enter the administration mode. First, the user enters a setup mode in step 55, which includes a menu selection ADMINISTRATION MODE. The user enters the administration mode in step 56 and is given submenu choices for either entering the locked state, had the computer been previously unlocked, or entering the unlocked state had the computer been previously locked. The locked state is entered in step 58 which writes in step 59 the command code 00 to location 30 of the CMOS RAM 17. The value 00 is a default value, and in the event the CMOS RAM 17 is replaced or has power removed therefrom, the computer remains in the locked state. Thus, the thief cannot frustrate the security function by tampering with the CMOS RAM 17.

The unlocked state may be entered through the administration mode by selecting in step 59 the unlocked feature. In this mode of operation, a non-zero unlock code is written in step 60 to memory location 30 of the CMOS RAM 17. In this event, each time the computer attempts a boot up sequence, memory location 30 will be checked in step 43 and if it contains the unlock code, decision block 44 will direct execution to execute the boot code in step 53, skipping the security function.

Figure 6:
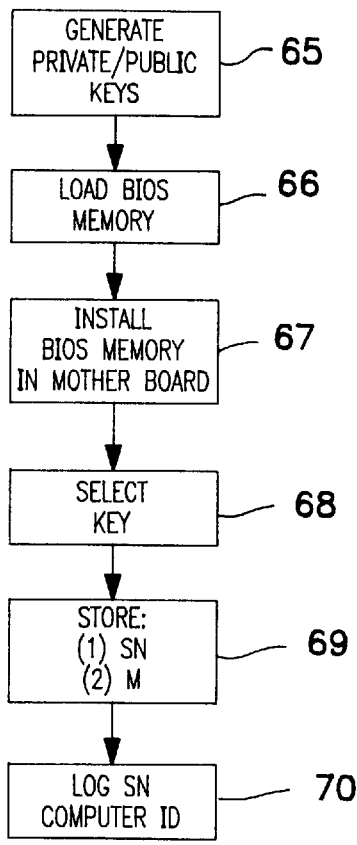
FIG. 6 illustrates the steps for creating BIOS routines which incorporates the security function.

The process of creating the security function as part of the contents of the BIOS memory is illustrated in FIG. 6. The process begins with a selection of a private/public key combination in step 65. The private/public keys will be used to encrypt a quantity which represents the product of a serial number for the key as well as the computer I.D. for the particular computer for which the key operates. The BIOS memory is prepared by storing within it, the routines illustrated in FIG. 3 including the POST Routine, security function routines, boot codes, and the peripheral routines. Further, the BIOS memory is loaded with the computer I.D. number for which it is to be installed, as well as the public key derived in step 65.

Once the routines are loaded for effecting the functions of FIG. 4, the BIOS memory is installed in the mother board of the computer 10 in step 67.

A key is selected in step 68 for programming with the information which is related specifically to the computer 10. The key includes the ROM 19 which is written in step 69 with a serial number unique to that key, if the serial number was not included at the time of the ROM manufacture, as well as an encrypted value M which is equal to the product of the computer's I.D. and the serial number assigned to the key.

A central log is maintained in step 70 of each key serial number and the respective computer I.D. which has been part of the encrypted value stored within the key.

In this way, in the event the user looses his key, he can obtain another one from the manufacturer by reporting his computer I.D. to the manufacturer. The manufacturer using the master list can identify the serial number of the key and create, using the private key, a new key for shipment to the user.

The encryption process is done in a tamper proof facility. In this way, the manufacturer maintains absolute control over who may obtain the information which would be useful in creating counterfeit keys which could be used to defeat the security function in a stolen computer.

The system also provides additional security in that only the manufacturer knows the private key so that even with knowledge of the serial number of the key and computer I.D., it is not possible to create a counterfeit key. Further, different manufacturers can use different private/public key pairs, making it possible for the same BIOS code to be used in each computer. Each manufacturer would not be able to generate encrypted values M for another manufacturer's computer as the encryption public/private key pair is private.

Computer manufacturers may include a warning on each of the computers, that the computer is equipped with a anti-theft protection, discouraging theft of a computer which could not be operated by its subsequent owner.

A variation of the foregoing technique would permit each computer user to create his own keys. In this instance, each computer would be sold with a private/public key pair. The public key would be installed in the BIOS as described, the private key given to the customer along with a utility file which permits the generation of additional keys. In this case, each customer has his own unique private/public key pair and may configure as many keys as needed to enable as many authorized users to operate the system.

Figure 7:
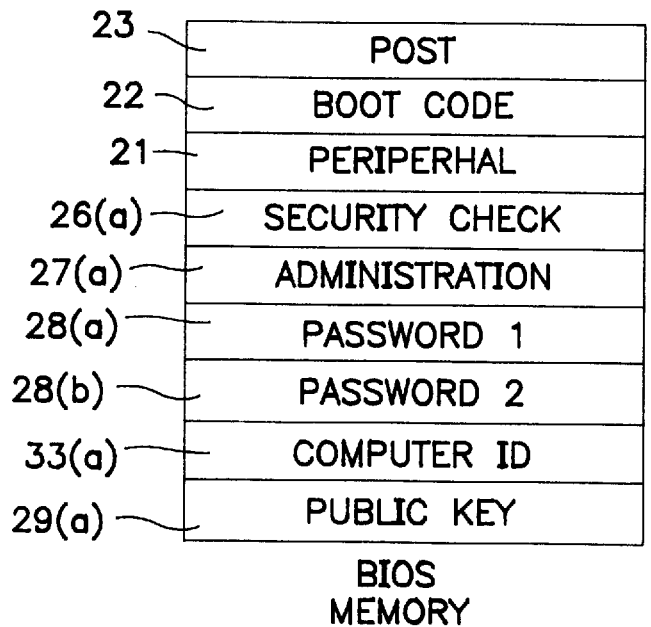
FIG. 7 illustrates the security routine within a BIOS memory in accordance with another embodiment of the invention.
Figure 8:
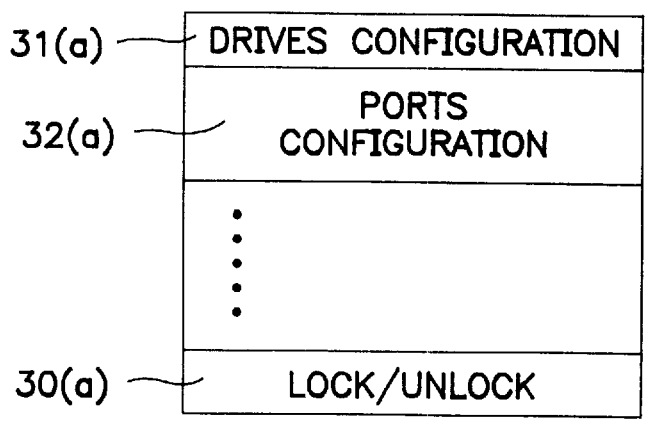
FIG. 8 illustrates the organization of the CMOS RAM 17(a) in accordance with the second embodiment of the invention.

A variation of the foregoing embodiment may be implement when it is undesirable to provide a separate hardware key for blocking the computer, and instead, relies upon a user entered password for protection. FIG. 7 illustrates the configuration of the BIOS EEPROM 15(a) in a system which relies on a user entered password instead of an externally connected key to enable complete execution of the BIOS routines. First and second passwords are entered in place of a key serial number by the user during an initial installation to locations 28(a) and 28(b) which may be written. Two other memory locations within the BIOS EEPROM 15(a) include a serial number or I.D. number 33(a) for the computer 10 as well as a public key 29(a) which is used to decrypt passwords entered by a user. As in the previous embodiment, CMOS RAM 17(a) of FIG. 8 contains the usual drive configuration data 31(a) and port configuration data 32(a). Further a location 30(a) is reserved in the CMOS RAM 17(a) to indicate whether the computer is in a locked state, requiring entry of one of the passwords, or whether the computer is in an unlocked state in which case the BIOS routine bypasses the security function and boots up the computer in the normal way.

The CMOS RAM 17(a) is configured so that in a default state i.e., when the CMOS RAM 17(a) is cleared by removing the battery, or replacing it, the computer is in the locked state. Only when an UNLOCKED code is written to the CMOS RAM location 30(a) will the BIOS routine complete execution without requiring a password. As in the previous embodiment there is an administration mode, to permit the user to switch between a locked and unlocked state. Additionally, the administrative mode permits the user to change passwords, as well as effecting an emergency operation when the password is lost or forgotten.

Figure 9:
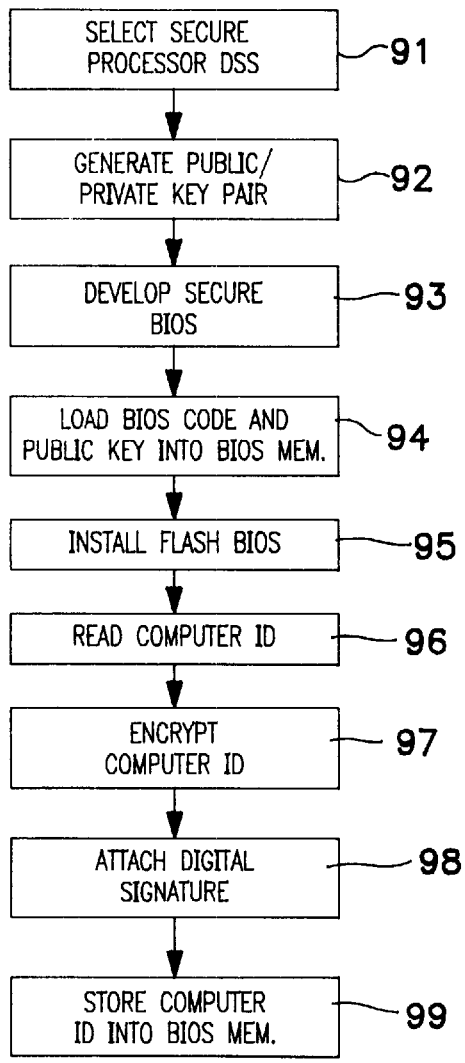
FIG. 9 is a flow chart which illustrates the creation of a BIOS memory having the security function of the second embodiment of the invention.

FIG. 9 illustrates the process for storing a password as well as exercising the locking option for locking or unlocking the computer. The computer in the locked state requires the user to enter his password each time a boot up sequence is started. The security function is implemented in the BIOS routines, such that if a password has been previously entered in memory, and the user has placed the computer in the locked state, a prompt will come up during the execution of the BIOS routines requesting the user to enter his password. If the password is correctly entered, and the BIOS security function verifies that the entered password is equal to the stored password, execution of the BIOS routines continues and the computer is rendered in an operative condition.

A security administration mode associated with the security function permits the user to register two valid passwords, and then to place the computer in either a locked state or unlocked state. In placing the computer in the unlocked state, the user must return to the security administration mode and select either the locked or unlocked state. Once one password has been registered and stored within the BIOS EEPROM 15(a), the user cannot return to the security administration mode unless he enters the appropriate password. The computer therefore cannot be unlocked without entering the password.

Along with the first and second user entered passwords stored in the BIOS EEPROM 15A, an encrypted computer serial number is provided by the manufacturer of the computer. The computer serial number will act as an emergency password, which in the event of the lost of the first and second passwords, permits the user to enter the administrative function. The actual computer serial number is not disclosed to the user, instead a public key encrypted value of the computer serial number is supplied to the user. The public key with the BIOS EEPROM 15(a) decrypts the encrypted value provided to the user, permitting its comparison with the actual serial number stored in a memory location of the BIOS EEPROM 15(a).

FIG. 9 illustrates the process for preparing the security function for storage in the BIOS EEPROM 15(a). A secure encryption system such as PKCS or DSS is selected in step 91 from which a private and public key pair is created in step 92. The BIOS routine is compiled in step 93, with the security function. The BIOS routines are configured to operate, and invoke the security function if the CMOS RAM 17(a) stores in location 30(a) a locked state code. Additionally, an administration function which will be evident from the succeeding figures is incorporated within the BIOS EEPROM for permitting password registration and/or changes, as well as selecting a locked or unlocked mode of operation. The computer serial number is stored within the BIOS EEPROM memory 15A in its unencrypted state. The BIOS code and public key is loaded in the BIOS EEPROM in step 94. The BIOS EEPROM 15(a) is then installed in the computer 10 mother board.

The computer serial number is also read from the computer, and a digital signature of the serial number is created in step 97. The digital signature is printed and sent along to the user permitting in the case of the loss of either password, entry to the administrative mode in lieu of use of the password.

Figure 10:
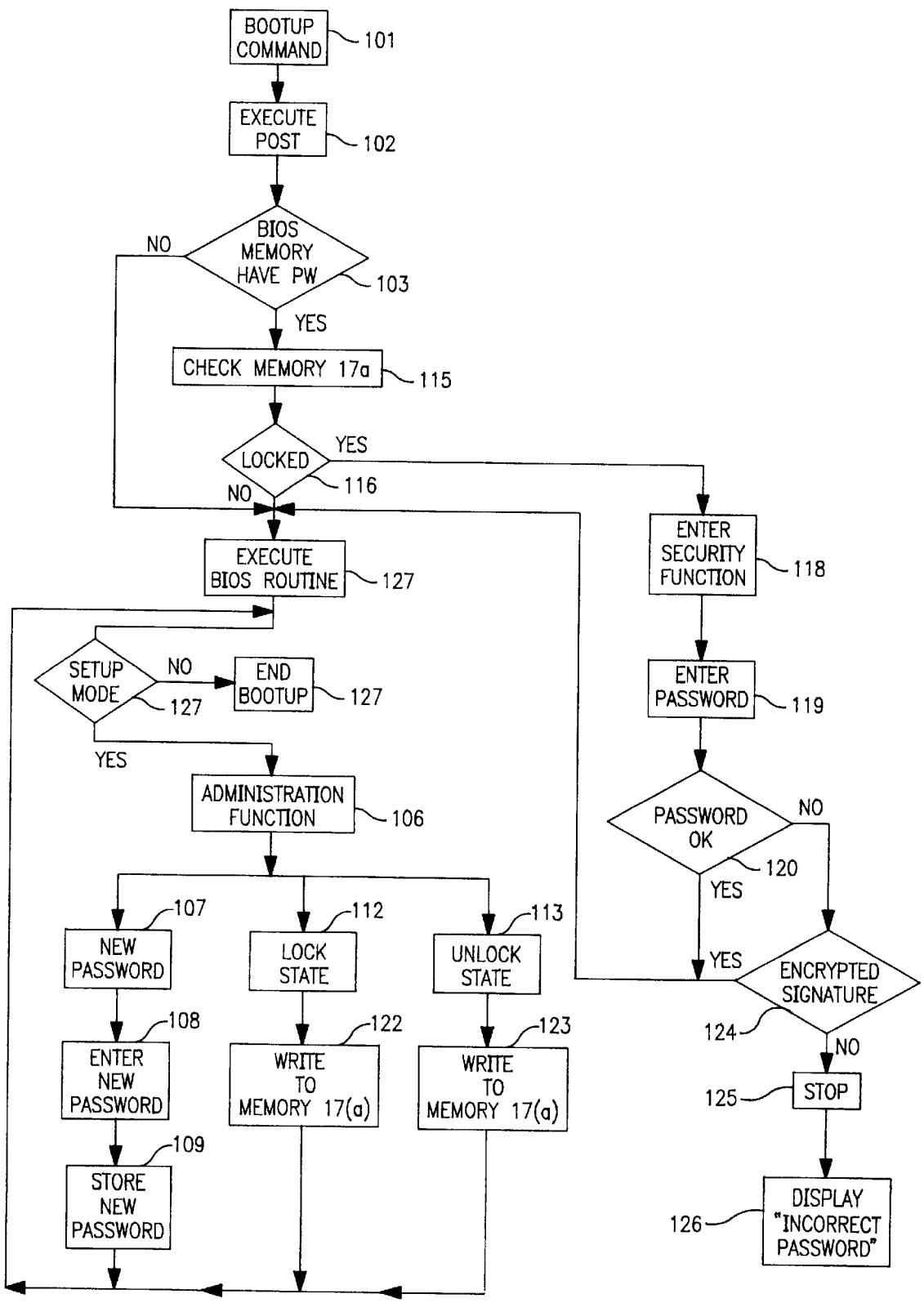
FIG. 10 illustrates the process executed by the security function according to the second embodiment.

FIG. 10 illustrates, in flow chart form, execution of the BIOS routines including the security function. At the user site, the user first executes a boot up command in step 101 for entering one or two passwords which he will use. The POST Routine is executed in step 102. As no passwords exists within the BIOS EEPROM memory 15(a) as determined in 103, the boot up process completes by executing the remaining BIOS routines in step 104. Following completion of the boot up process the user may enter a SETUP mode 105 common to operating system configurations. The security administration mode 106 is selected by the user from the SETUP mode menu, which includes several sub-menu items. If the setup mode is not selected, the boot up ends in step 106. The new PASSWORD menu item is selected by the user in step 107 from the administration function 106. The user may enter one or two passwords in step 108 and the security function routine will store the password in step 109 in the BIOS EEPROM memory 15(a). This feature also permits new passwords to be entered in place of any two previously entered passwords.

If a single password has been entered into the BIOS EEPROM 15A, a subsequent boot up and selection of the security administration mode will require use of the single password. An additional password may be entered into the system by the first user, from the same menu selection from the security administration mode.

If the user wishes to lock or unlock the computer and enter the SETUP mode in step 105, he enters the security administration mode in step 106 again. One of the menu items provided in the security administration mode is a lock state 112, as well as an unlock state 113. By selecting the lock state 112 each subsequent boot up of the computer 10 will request a password verification from the user. The selection of the lock state clears the memory location 30(*a*) of the CMOS RAM 17(*a*). The BIOS routine will therefore encounter the default value in location 30(*a*) during each subsequent execution in step 115 and decision block 116 will require that the BIOS function execute the security function.

Execution of the security function in step 118 will generate a prompt to enter the password in step 119. The user enters a password which is verified in decision block 120 by the security function and the boot up process completes execution in step 104.

The computer 10 may be unlocked by returning to the security administration mode and selecting the appropriate unlock submenu item 113. Selecting the unlocked state will write a unlock code at location 30(*a*) of the CMOS RAM 17(*a*) in step 123. Subsequent boot up processes will check the contents of location 30(*a*) of CMOS RAM 17(*a*) in decision block 116 and skip the security function.

The embodiment provides an emergency mode such that the user can enter the administration mode without entering either one of the user selected passwords, if he had access to the digital signature supplied with the computer. The user, instead of entering a password, enters the encrypted signature supplied to him in step 119. The public key stored within the BIOS memory 15A decrypts the entered digital signature, to a value equal to the computer serial number. This signature is verified by the BIOS security function in decision block 124, by comparing it to the computer serial number stored within the BIOS EEPROM 15A. The administration mode may then be entered in step 106 which provides for a menu selection of either selecting a new password. Entry and storage of the new password are effected as in the original password registration.

If the decrypted signature and stored computer serial number do not match, execution steps in step 125, and a message is displayed in step 126 "INCORRECT PASSWORD".

In the event a user looses both passwords and digital signatures, it is possible for the manufacturer to clear passwords from the BIOS permitting the security to be reestablished. Additionally, it is possible to have a user phone in the computer serial number, at which point a digital signature is created and supplied to the user.

Obviously, the disclosure to the user of the digital signature or any cooperation in removing the passwords will depend on a user establishing his authority, thus avoiding any cooperation with a thief or his purchaser.

Thus there has been described with respect to embodiments a method for providing computer security through the BIOS function. Those skilled in the art will recognize yet other embodiments of the invention identified by the claims which follow.

What is claimed is:

1. An apparatus for preventing theft of a personal computer comprising:
    a personal computer having a processing unit having a BIOS routine stored in a BIOS memory, which initiates operation of an operating system of said computer, said BIOS routine including a security function which requests a unique quantity from a user before permitting said computer operating system to initiate operations, said BIOS security function being implemented by a series of programming steps which perform the function of checking the contents of a random access memory within said computer to determine if the security function is on or off, requesting a user to enter a said unique quantity if said security function is on, comparing said quantity with a quantity previously stored in said BIOS memory, and enabling said BIOS to continue execution to invoke said operating system if said quantities match, wherein said security function includes a series of programming steps which provide an administration function, said administration function providing a lock function by programming said random access memory with a lock code at the request of a user which requires entry of said unique quantity each time said computer is operated, or an unlock function for programming said random access memory with an unlock code at the request of the user which does not require the entry of a user supplied quantity for subsequent operation.

2. The apparatus according to claim 1 wherein said security function includes stored in said BIOS memory a stored serial number, and which includes a series of programming steps which verify if a user supplied quantity is equivalent to said serial number.

3. The apparatus according to claim 2 wherein said administration function includes a series of computing steps which permit a user to change said quantity stored in said BIOS memory following entry of a previously entered quantity.

4. The apparatus according to claim 1 wherein said random access memory is a battery operated random access memory.

5. A method for protecting a computer from unauthorized use by storing in a BIOS memory containing BIOS instructions a security function which is capable of inhibiting operation of said computer, said security function comprising the following programming steps:
    checking the contents of an internal random access memory for a locked state command to see if said computer was previously placed in a locked state;
    if said computer is in the locked state, requesting said user to enter a password;
    comparing said password with a password previously entered into said BIOS memory; and
    inhibiting execution of said BIOS instructions if said passwords do not agree.

6. The method according to claim 5 further comprising storing a programming routine in said BIOS memory which permits a user to place the computer in an unlocked state following verification that said passwords agree.

7. The method according to claim 5 wherein said programming step for placing said computer in an unlocked state deletes from said internal memory said locked state command.

8. A method for inhibiting access to a personal computer device comprising:
    storing within a BIOS memory having BIOS instructions for executing a boot up sequence, a public key as well as instructions to inhibit execution of a portion of said sequence of said instructions until a users authority is validated;
    storing a unique code identifying said computer device into said BIOS memory;
    calculating a digital signature from said unique code;

at boot up time for said personal computer, prompting a user to enter a password;

entering said digital signature in lieu of a password;

verifying said digital signature from said stored public key and said unique code thereby validating said users authority; and entering an administration mode which permits said user to enter a personal password into said BIOS memory for future use and to continue said boot up sequence by said computer.

9. The method according to claim 8 wherein said BIOS instructions request said user to enter said user password during future execution of said instructions to boot up said computer, and inhibits said boot up sequence if said user does not enter said password.

10. The method according to claim 9 wherein said administration mode permits selection of a locking state by said user which inhibits completion of each subsequent boot up sequence unless a user password is entered each time said boot up instructions are executed.

11. The method according to claim 10 wherein said locking state is effected by writing a locking code to an internal memory which is read each time a subsequent execution sequence of BIOS instructions occurs, and said BIOS instructions continuing execution only if said user enters a valid password.

12. The method according to claim 11 wherein said user is given an option by said administration mode following verification of said entered password to exit said locking state.

13. The method according to claim 12 wherein said BIOS instructions exit said locking state by deleting said locking code from said internal memory.

14. An anti theft protection device for a personal computer comprising:

a programmable memory within said computer for storing BIOS routines for booting up said computer as well as a security routine having unique security information which communicates with an internal memory and an externally connected device having unique information contained therein;

a detachable external memory device containing said unique information which is used by said security routine to enable execution of said BIOS routine when said unique security information matches said unique information when said internal memory includes a locking code, whereby said BIOS routine can only be completely executed if said external memory device is in communication with said computer;

wherein said security routine include an Administration function which permits said user to enter a command to unlock said computer from a locked state whereby said BIOS routines may be subsequently executed in the absence of said external device; and wherein said administration function unlocks said computer from a locked state by inserting unlocking data in a specified location in said internal memory of said computer, and said BIOS routines reads said location each time said computer is activated, permitting execution of said BIOS routines if said unlocking data is present in said internal memory.

15. The anti-theft device according to claim 13 wherein during execution of said BIOS routines, said security function prompts a user to connect said external memory device to said computer if said computer is in the locked state.

16. The device according to claim 14 wherein said internal memory is a battery operated random access memory.

* * * * *